United States Patent Office 2,785,162
Patented Mar. 12, 1957

2,785,162

PROCESS FOR THE FORMYLATION OF A 5 NITROSOURACIL

John Swidinsky, Newark, and Manuel M. Baizer, Union, N. J., assignors to The New York Quinine and Chemical Works, Inc., New York, N. Y.

No Drawing. Application April 23, 1954,
Serial No. 425,313

5 Claims. (Cl. 260—256.4)

Our invention relates to a method of making xanthines from 4-amino-5-nitrosouracils which bear hydrogen or a lower alkyl group such as methyl in the 1-position of the molecule, and a lower alkyl group such as methyl in the 3-position of the molecule. These xanthines are useful drugs, for example, caffeine is a widely used stimulant which is described in the United States Pharmacopeia XIV (1950).

A synthesis of caffeine from such a uracil compound dates from the pioneering work of W. Traube reported in Berichte der deutsch. Chem. Ges. 33, 3052, 1900. The following reaction scheme illustrates the method:

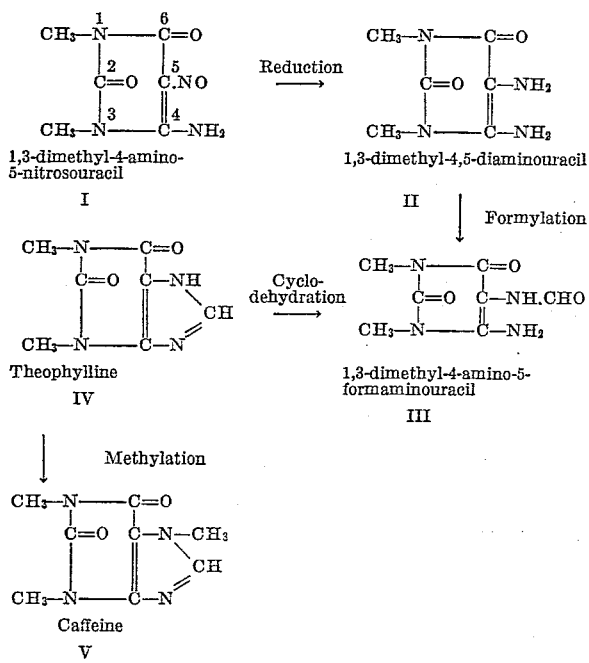

Numerous attempts have been made to commercialize this laboratory synthesis, but none of them has given complete satisfaction. It is now recognized that certain operating conditions must be observed in this synthesis in order to produce caffeine most economically under modern manufacturing conditions. It is desirable that the process: (1) give high yields of caffeine, (2) use inexpensive reagents for affecting the transformations indicated above, (3) avoid the introduction of substances or the formation of by-products which must be removed, thereby adding to processing costs, (4) use simple equipment not requiring special design or complicated safety controls as in catalytic hydrogenation, (5) minimize the amount of handling, e. g. filtrations, distillations, required in the processing, (9) obtain a product easily purified to United States Pharmacopeia standards, and (7) avoid the need for recovering expensive solvents.

The reduction step has been carried out in the prior art by using ammonium sulfide (Traube, loc. cit.) or metal, (e. g. zinc) and acid (PB Report 86142), or catalytically with nickel and hydrogen (PB Report 1246, Sept. 18, 1945, page 96), or palladium and hydrogen (U. S. Patent 2,646,432). These methods make it necessary either to remove sulfur or zinc salt from the reaction mixture, or to purify II (which discolors readily), or to employ catalytic hydrogen reduction with its attendant hazards.

The formylation step has been performed in the prior art using formic acid (Traube, loc. cit.), or sodium formate and sulfuric acid (PB Report 86142), or formamide (Bredereck, Germ. Patent 864,868, Jan. 29, 1953; CA 47, 11238B (1953). In the latter case II may be converted to IV without prior isolation of III, but IV must be isolated before it can be converted to V.

The reduction and formylation stages may be combined when I is treated with zinc and formic acid (C. A. 41,96i, 1947; Germ. Patent 859,311 Dec. 11, 1952, C. A. 47, 11262d, 1953). Over 20 moles of formic acid per mole of I are used. Zinc formate must be removed and for economy's sake excess formic acid must be recovered.

It is apparent, therefore, that the prior art methods are defective because they cannot meet all the requirements for safe, simple and economic manufacturing purposes.

It is an object of our invention to provide a highly economical process for producing caffeine of high purity without isolating or purifying any of the intermediates between I and V.

It is a further object of our invention to transform I to III in a single operation without the introduction of extraneous reagents and therefore to convert I to V in substantially a two-step operation. Other objects will be apparent from the following description.

We have discovered that when I is treated with formic acid in the presence of a catalyst it is directly converted to III in high yield and in high state of purity. It is not necessary to isolate III in order to proceed with the preparation of high quality V.

The medium may be water or an inert non-aqueous solvent such as 90% isopropyl alcohol, commercial strength.

The catalyst is preferably one of the platinum group, such as platinum, palladium, rhodium, and the like. It may be employed in the form of finely divided metal or colloidal dispersion on a support such as charcoal, pumice, and the like.

Since formic acid is the reductive formylating agent and since carbon dioxide is evolved, the entire reaction, when water is used as the medium, may be conducted in an open vessel such as a beaker or a kettle. When isopropyl alcohol is the reaction medium, it is preferable to conduct the reaction in a vessel equipped for returning vaporized alcohol.

The quantity of formic acid used may be varied within rather wide limits ranging from about 3.5 moles of acid per mole of I to 5 or more moles per mole of I. We prefer to use about 4 moles of formic acid to one mole of I. The formic acid is best added as the commercially available 85–90% solution.

The volume of solvent used may likewise be varied considerably. We prefer to use a quantity which will allow efficient stirring of the reaction mixture at all times and find this quantity to be about 10 ml per gram of I charged.

The quantity of catalyst employed depends upon the reaction speed desired and also upon whether it is desired to re-use the catalyst. Using a 5% palladium-on-charcoal catalyst, e. g., we prefer to use of it about 4% by weight of I and to re-use the catalyst.

The following examples illustrate our invention:

*Example 1.—Preparation of caffeine*

A mixture of 100 g. of I monohydrate (.5 mole) and 950 cc. of water were stirred vigorously at room temperature. A slurry of 4.00 g. of 5% palladium charcoal in 50 cc. of water was added next and finally 90 cc. of 85% formic acid. The reaction is exothermic and carbon dioxide is evolved. The temperature rises to 33–40° (in about 1 hour). The mixture is then heated slowly to 40–45° and kept at that range until III starts to precipitate and most of I has disappeared (in about 1 hour). The evolution of carbon dioxide abates. The temperature is raised slowly to 75° (in about 1 and ½ hour) and kept there until the pink color of I has completely disappeared and complete solution (except for the catalyst) is obtained (in about 30 minutes). Then the mixture is brought to boiling, diluted somewhat and filtered to recover the catalyst for re-use. Strong caustic is added to the filtrate to bring the pH to about 12–13. The solution is boiled for one hour, cooled and methylated with dimethylsulfate in the usual manner. The pH is adjusted and the first crop of caffeine recovered from a volume of 1000 ml. The second crop is recovered from about 250 ml. The combined weight of these two crops, after drying to constant weight at 110° is 84.9 g. (87.3% based on I). The color is off-white and the melting point is above 230° (corr.). The melting point of caffeine given in the United States Pharmacopeia XIV (1950) is 235 to 237.5°. Chloroform extraction of the mother liquor yielded an additional quantity of crude caffeine. Use of methylating agents other than dimethylsulfate such as methyl chloride, methyl iodide and the like, is also feasible. If desired, the process may be interrupted to isolate the theophylline.

*Example 2.—Preparation of 3-methylxanthine*

5.10 g. of 3-methyl-4-amino-5-nitrosouracil (prepared according to Traube, Ber., 33, 3035, 1900) was stirred with 50 ml. of water and 0.20 g. of 5% palladium-on-charcoal. The mixture was warmed to 30° and 6.5 g. of 85% formic acid was added. Heat and carbon dioxide were evolved; the temperature was maintained at 30–40° until all the pink color had disappeared (about 2.5 hours). A white solid formed during this period. When the nitroso compound had completely disappeared the mixture was heated under reflux for two hours and then chilled. The formamino compound plus catalyst were removed by filtration and found to weigh 4.58 g. It did not melt up to 300°.

The formamino compound was converted to its sodium salt and cyclized to 3-methylxanthine by the method of Traube, loc. cit. The 3-methylxanthine gave a perchlorate which, after drying on a porous plate melted at 230° with decomposition (Bredereck, Chem. Ber. 86, 853, 1953 reports 227–229°). On methylation with methyl chloride and excess sodium hydroxide at 80° and 40 lbs. pressure it yielded caffeine which after two recrystallizations from water melted at 231–235° corr. and gave no depression with authentic caffeine.

3-methylxanthine may be converted to theobromine or caffeine by known procedures.

The examples show that the reaction starts exothermically and is then brought to completion by the application of external heat, preferably in slow stages, followed by boiling. We have found that the reaction will also proceed, although more slowly, without external heat.

It will be seen from these examples that our process conforms closely to the optimal operating conditions of caffeine manufacture outlined above. The process greatly simplifies the manufacture because it is performed without interruption and it passes through three intermediate stages without requiring isolation of the intermediates. Yet it avoids the formation of by-products as is evidenced by the high yield of substantially pure caffeine. It combines catalytic reduction and formylation in one step of reductive formylation of I to III. This expedient is entirely novel and proceeds with surprising smoothness.

We have thus been able to accomplish our objects and while our specification discloses the preferred operating conditions of our process, we consider all equivalent conditions and materials to be within the scope of our invention and of our appended claims.

What we claim is:

1. The catalytic reductive formylation of a 5-nitrosouracil derivative of the formula

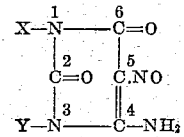

wherein X stands for a member selected from the group consisting of hydrogen an a lower alkyl group and Y stands for a lower alkyl group, which comprises the steps of mixing the uracil derivative with water, formic acid and a catalyst of the platinum group dispersed on a support, and stirring the mixture until the color of the nitroso compound has disappeared.

2. The catalytic reductive formylation of a 5-nitrosouracil derivative of the formula

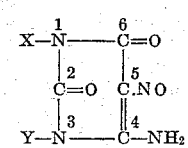

wherein X stands for a member selected from the group consisting of hydrogen an a lower alkyl group and Y stands for a lower alkyl group, which comprises the steps of mixing the uracil derivative with water, formic acid and a catalyst of the platinum group dispersed on a support and stirring the mixture and heating it until the color of the nitroso compound has disappeared, and then bringing it to a boil.

3. The catalytic reductive formylation of a 5-nitrosouracil derivative of the formula

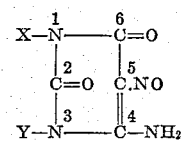

wherein X stands for a member selected for the group consisting of hydrogen an a lower alkyl group and Y stands for a lower alkyl group, which comprises the steps of mixing the uracil derivative with water, formic acid and a catalyst of the platinum group dispersed on a support and stirring the mixture and heating it in slow stages until the color of the nitroso compound has disappeared, and then bringing it to a boil.

4. The process of claim 3 in which palladium is used as the catalyst.

5. The process of claim 3 in which the catalyst is 5% palladium-on-charcoal.

References Cited in the file of this patent

UNITED STATES PATENTS 2,646,432    Homeyer _____ July 21, 1953

OTHER REFERENCES

Bobranski et al.: J. Am. Pharm. Assoc. 37, 62–64 (1948).

Traube: Ber. Deut. Chem. 33, 3040, 3049 and 3050 (1900).